US011871200B2

(12) United States Patent
Chen et al.

(10) Patent No.: US 11,871,200 B2
(45) Date of Patent: Jan. 9, 2024

(54) SPEAKER AND ELECTRONIC DEVICE

(71) Applicant: VIVO MOBILE COMMUNICATION CO., LTD., Dongguan (CN)

(72) Inventors: Xu Chen, Dongguan (CN); Bin Luo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/975,593

(22) Filed: Oct. 27, 2022

(65) Prior Publication Data

US 2023/0048346 A1    Feb. 16, 2023

Related U.S. Application Data

(63) Continuation of application No. PCT/CN2021/089549, filed on Apr. 25, 2021.

(30) Foreign Application Priority Data

Apr. 30, 2020 (CN) .......................... 202010362949.1

(51) Int. Cl.
  *H04R 7/04* (2006.01)
  *H04R 1/28* (2006.01)
  *G06F 1/16* (2006.01)

(52) U.S. Cl.
  CPC ........... *H04R 7/045* (2013.01); *G06F 1/1605* (2013.01); *H04R 1/2853* (2013.01); *H04R 2400/03* (2013.01); *H04R 2499/01* (2013.01)

(58) Field of Classification Search
  CPC .. H04R 7/045; H04R 1/2853; H04R 2400/03; H04R 2499/15; H04R 7/04–10; G06F 1/1605
  See application file for complete search history.

(56) References Cited

U.S. PATENT DOCUMENTS

2012/0160597 A1    6/2012  Li et al.
2018/0091902 A1*   3/2018  Salvatti ................. H04R 9/045

FOREIGN PATENT DOCUMENTS

CN    101326855 A    12/2008
CN    103190072 A     7/2013
CN    103444069 A    12/2013
(Continued)

OTHER PUBLICATIONS

International Search Report issued in corresponding International Application No. PCT/CN2021/089549, dated Jul. 14, 2021, 4 pages.
(Continued)

*Primary Examiner* — Mark Fischer
(74) *Attorney, Agent, or Firm* — IPX PLLC

(57) ABSTRACT

A speaker and an electronic device are provided. The speaker includes a counterweight body, and a lower shell, a middle shell, an electric vibration plate, and a dome where the lower shell, the middle shell, and the electric vibration plate are matched to form an accommodating cavity, and the counterweight body is disposed in the accommodating cavity and is connected to a first surface of the electric vibration plate; the dome is disposed on a second surface of the electric vibration plate away from the counterweight body; and when a voltage is applied to the electric vibration plate, the electric vibration plate drives the dome to move.

20 Claims, 4 Drawing Sheets

(56) References Cited

FOREIGN PATENT DOCUMENTS

| | | |
|---|---|---|
| CN | 103563012 A | 2/2014 |
| CN | 205320287 U | 6/2016 |
| CN | 206302567 U | 7/2017 |
| CN | 206302568 U | 7/2017 |
| CN | 208227320 U | 12/2018 |
| CN | 209390316 U | 9/2019 |
| JP | 2005051949 A | 2/2005 |
| WO | 2014086993 A1 | 6/2014 |

OTHER PUBLICATIONS

First Office Action issued in related Chinese Application No. 202010362949.1, dated Mar. 1, 2022, 7 pages.
International Search Report issued in corresponding International Application No. 21797383.3, dated Oct. 9, 2023, 9 pages.

\* cited by examiner

SPEAKER AND ELECTRONIC DEVICE

CROSS-REFERENCE TO RELATED APPLICATIONS

This application is a continuation of International Application No. PCT/CN2021/089549, filed on Apr. 25, 2021, which claims priority to Chinese Patent Application No. 202010362949.1, filed on Apr. 30, 2020. The entire contents of each of the above-identified applications are expressly incorporated herein by reference.

TECHNICAL FIELD

The present disclosure relates to the field of electronics, and in particular to a speaker and an electronic device.

BACKGROUND

At present, mainstream speakers are implemented in the following principle: when a current-carrying conductor passes through a magnetic field, it will be subject to a force whose direction is perpendicular to directions of a current and the magnetic field, and the magnitude of force is proportional to the current, a wire length, and magnetic flux density. A speaker includes a magnetic steel, a voice coil, and a diaphragm. When an alternating current is input into the voice coil, the voice coil is subject to an alternating driving force, resulting in an alternating motion, which drives the diaphragm to vibrate and repeatedly pushes the air to enable the speaker to make sound.

Since the speaker includes the magnetic steel and a coil, and magnetic fields generated by the magnetic steel and the coil can interfere with devices around the speaker.

SUMMARY

Embodiments of the present disclosure provide a speaker and an electronic device.

An embodiment of the present disclosure provides a speaker, including a counterweight body, and a lower shell, a middle shell, an electric vibration plate, and a dome; where
the lower shell, the middle shell, and the electric vibration plate are matched to form an accommodating cavity, and the counterweight body is disposed in the accommodating cavity and is connected to a first surface of the electric vibration plate;
the dome is disposed on a second surface of the electric vibration plate away from the counterweight body; and
when a voltage is applied to the electric vibration plate, the electric vibration plate drives the dome to move.

Further, the electric vibration plate is an annular structural member provided with a first through hole, and the dome covers the first through hole.

Further, the counterweight body is an annular structural member provided with a second through hole, and the first through hole and the second through hole are distributed opposite to each other.

Further, the electric vibration plate is an ion-conductive vibration plate;
when a voltage applied to the ion-conductive vibration plate is a first voltage, the ion-conductive vibration plate drives the dome to move along a first direction; or
when a voltage applied to the ion-conductive vibration plate is a second voltage, the ion-conductive vibration plate drives the dome to move along a second direction, where
polarities of the first voltage and the second voltage are opposite, and the first direction is opposite to the second direction.

Further, when the voltage applied to the ion-conductive vibration plate is a first voltage, the ion-conductive vibration plate drives the dome to move a first distance along a first direction; or
when the voltage applied to the ion-conductive vibration plate is a third voltage, the ion-conductive vibration plate drives the dome to move a second distance along the first direction, where
polarities of the first voltage and the third voltage are the same, the third voltage is greater than the first voltage, and the first distance is different from the second distance.

Further, when the voltage applied to the ion-conductive vibration plate is the first voltage, the ion-conductive vibration plate drives the dome at a first rate to move along a first direction; or
when the voltage applied to the ion-conductive vibration plate is a third voltage, the ion-conductive vibration plate drives the dome at a second rate to move along the first direction, where
polarities of the first voltage and the third voltage are the same, the third voltage is greater than the first voltage, and the first rate is different from the second rate.

Further, the electric vibration plate has a first region, a second region, and a third region, where
the counterweight body is disposed in the first region of the electric vibration plate, the electric vibration plate is connected to the middle shell through the second region, and the third region is located between the first region and the second region; and
the third region of the electric vibration plate is recessed along a direction toward the lower shell, or the third region of the electric vibration plate is recessed along a direction away from the lower shell.

Further, a third through hole is disposed in the middle shell, and a gap is formed between the counterweight body and the middle shell.

Further, the third through hole is a counterbore, and a countersunk head of the counterbore is located at an end of the middle shell away from the dome, and in a movement direction of the dome, projections of the dome and the counterweight body are both located within a projection of the counterbore.

Further, a height of the counterweight body is greater than half of a height of the counterbore, and the height of the counterweight body is less than the height of the counterbore.

Further, the speaker also includes a vibration plate bracket, where the vibration plate bracket is disposed around the electric vibration plate, and the electric vibration plate is fixedly connected to the middle shell through the vibration plate bracket.

An embodiment of the present disclosure further provides an electronic device, including the foregoing speaker.

In the embodiments of the present disclosure, the speaker includes the counterweight body, and the lower shell, the middle shell, the electric vibration plate, and the dome; where the lower shell, the middle shell, and the electric vibration plate are matched to form an accommodating cavity, and the counterweight body is disposed in the accommodating cavity and is connected to a first surface of the electric vibration plate; the dome is disposed on a second surface of the electric vibration plate away from the counterweight body; and when a voltage is applied to the electric vibration plate, the electric vibration plate drives the dome to move.

DETAILED DESCRIPTION

The following describes the embodiments of the present disclosure with reference to the accompanying drawings. Apparently, the described embodiments are some rather than all of the embodiments of the present disclosure.

Figure 1:
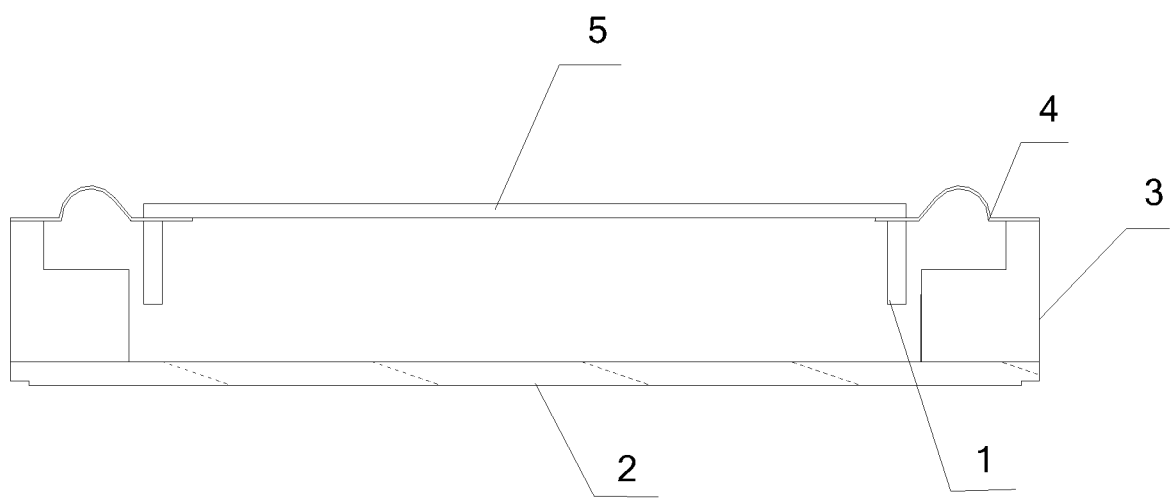
FIG. 1 is a first schematic structural diagram of a speaker according to an embodiment of the present disclosure.
Figure 2:
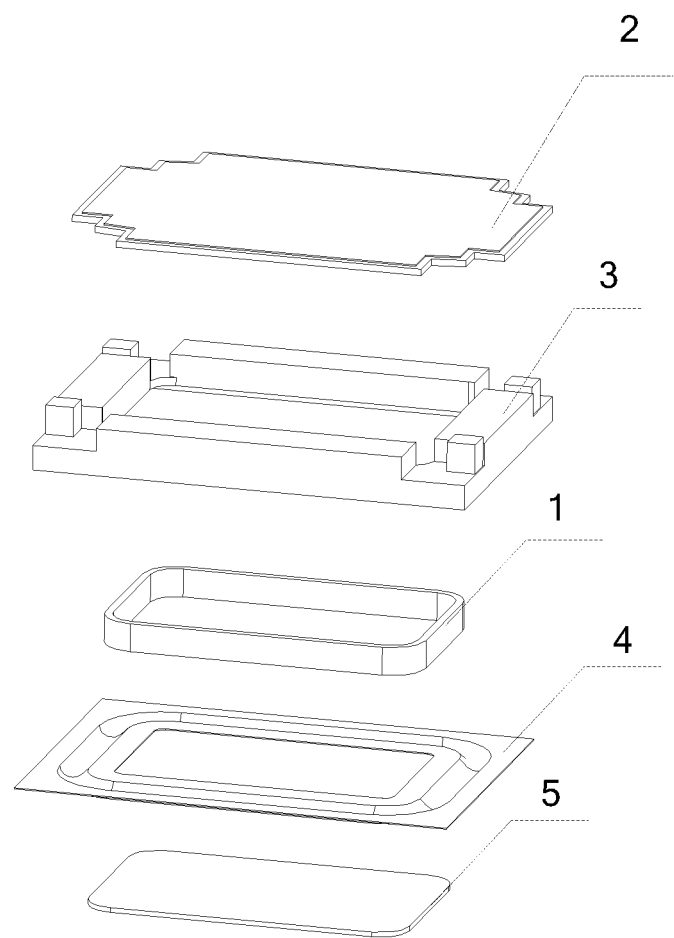
FIG. 2 is a second schematic structural diagram of the speaker according to an embodiment of the present disclosure.
Figure 3:
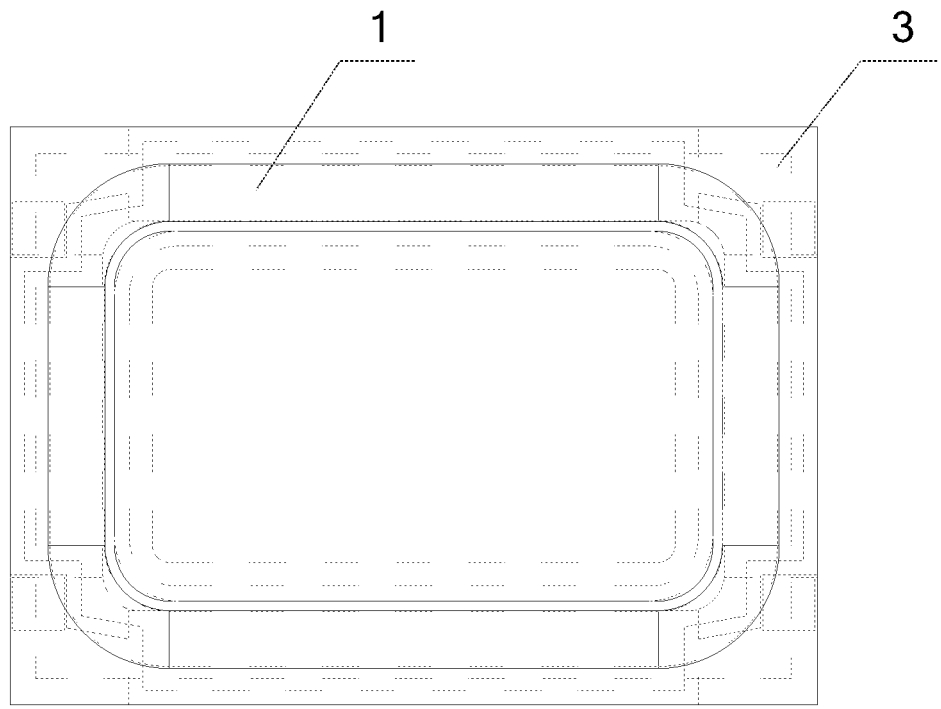
FIG. 3 is a partial structural schematic diagram of the speaker according to an embodiment of the present disclosure.

Referring to FIG. 1 to FIG. 3, this embodiment provides a speaker, including a counterweight body 1, and a lower shell 2, a middle shell 3, an electric vibration plate 4, and a dome 5; the lower shell 2, the middle shell 3, and the electric vibration plate 4 are matched to form an accommodating cavity, the counterweight body 1 is disposed in the accommodating cavity and is connected to a first surface of the electric vibration plate 4; the dome 5 is disposed on a second surface of the electric vibration plate 4 away from the counterweight body 1; and when a voltage is applied to the electric vibration plate 4, the electric vibration plate 4 drives the dome 5 to move.

In the foregoing structure, the lower shell 2, the middle shell 3, and the electric vibration plate 4 are matched to form the accommodating cavity, the counterweight body 1 is disposed in the accommodating cavity and is connected to the first surface of the electric vibration plate 4. For example, the counterweight body 1 can be bonded to the first surface by using a caking agent, so that the counterweight body 1 is suspended in the accommodating cavity. This way, when the electric vibration plate 4 drives the dome 5 to move, the counterweight 1 is also driven to move, and the counterweight 1 is configured to adjust a resonant frequency of the speaker. When a voltage is applied to the electric vibration plate 4, the electric vibration plate 4 drives the dome 5 to move, thereby driving air around the dome 5 to vibrate, so as to make sound.

In this embodiment, the speaker includes the counterweight 1, and the lower shell 2, the middle shell 3, the electric vibration plate 4, and the dome 5; the lower shell 2, the middle shell 3, and the electric vibration plate 4 are matched to form the accommodating cavity, and the counterweight body 1 is disposed in the accommodating cavity and is connected to the first surface of the electric vibration plate 4; the dome 5 is disposed on a second surface of the electric vibration plate 4 away from the counterweight body 1; and when a voltage is applied to the electric vibration plate 4, the electric vibration plate 4 drives the dome 5 to move. The magnetic steel and the coil structure are canceled in a structure of the speaker in this embodiment, so that magnetic field interference with circuits and devices around the speaker can be prevented, and a working environment for the circuits and the devices around the speaker can be purified. In addition, the speaker in this embodiment has a simple structure and occupies small space, which can better meet requirements for thinning an electronic device.

Further, the electric vibration plate 4 is an ion-conductive vibration plate, and when a voltage applied to the ion-conductive vibration plate is a first voltage, the ion-conductive vibration plate drives the dome 5 to move along a first direction; or when a voltage applied to the ion-conductive vibration plate is a second voltage, the ion-conductive vibration plate drives the dome 5 to move along a second direction, where polarities of the first voltage and the second voltage are opposite, and the first direction is opposite to the second direction, that is, the first direction and the second direction are opposite to each other. Voltages with opposite polarities are applied to the ion-conductive vibration plate alternatively, so that the ion-conductive vibration plate drives the dome 5 to move alternately along the first direction and the second direction, thereby driving air around the dome 5 to vibrate and then make sound.

The ion-conductive vibration plate is a composite actuating element, such as a soft polymer actuating element. In some embodiments, the ion-conductive vibration plate includes a first electrode layer, an ion exchange resin layer, and a second electrode layer stacked in sequence, and the ion exchange resin layer has a polymer electrolyte.

The ion-conductive vibration plate can form the first electrode layer and the second electrode layer on two opposite surfaces on ion exchange resin by chemical copper plating, gold plating, or the like, and displacement performance can be improved by increasing an electrode's surface area. By applying a voltage to the vibration plate 4, cations in the polymer electrolyte moves to a cathode side, causing a difference in swelling between the front and the back of the vibration plate 4. This difference can cause the vibration plate 4 to deform, and alternately change a direction of the voltage applied to the vibration plate 4, so that a deformation direction of the vibration plate 4 changes alternately, thereby generating vibration. A vibration amplitude can be from 0.1 mm to 10 mm, and the vibration amplitude can be controlled by setting the thickness of the vibration plate 4 and adjusting the magnitude of a current passing through the vibration plate 4.

Figure 4:
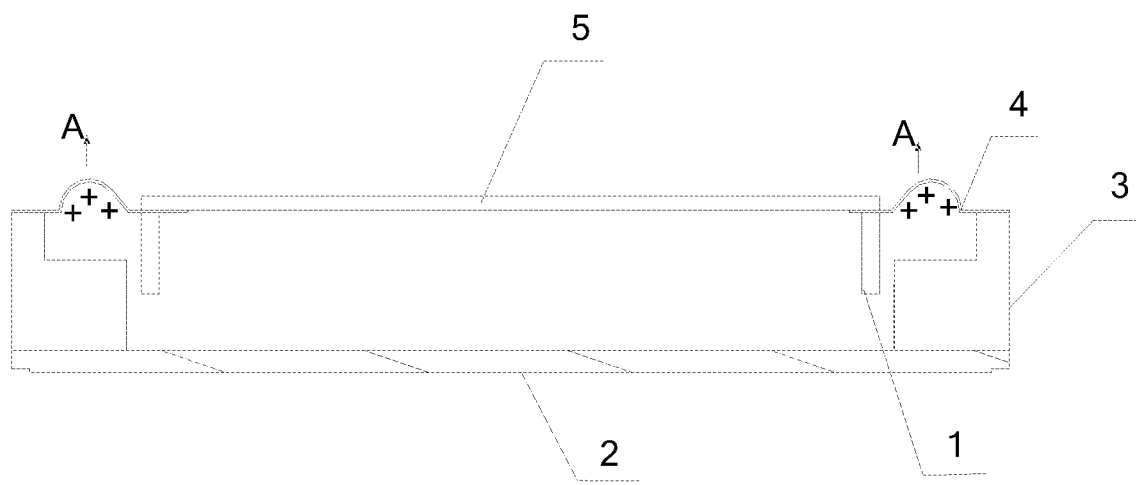
FIG. 4 is a first schematic diagram of distribution of cations in a vibration plate according to an embodiment of the present disclosure.

FIG. 4 is a schematic diagram of distribution of cations in a vibration plate 4 when a forward current passes through the vibration plate 4. Cations move to a cathode side of the vibration plate 4 (that is, a lower side of the vibration plate 4 in FIG. 4), the vibration plate 4 moves upward and drives the dome 5 to move upward, and A shown in FIG. 4 is a movement direction of the vibration plate 4.

Figure 5:
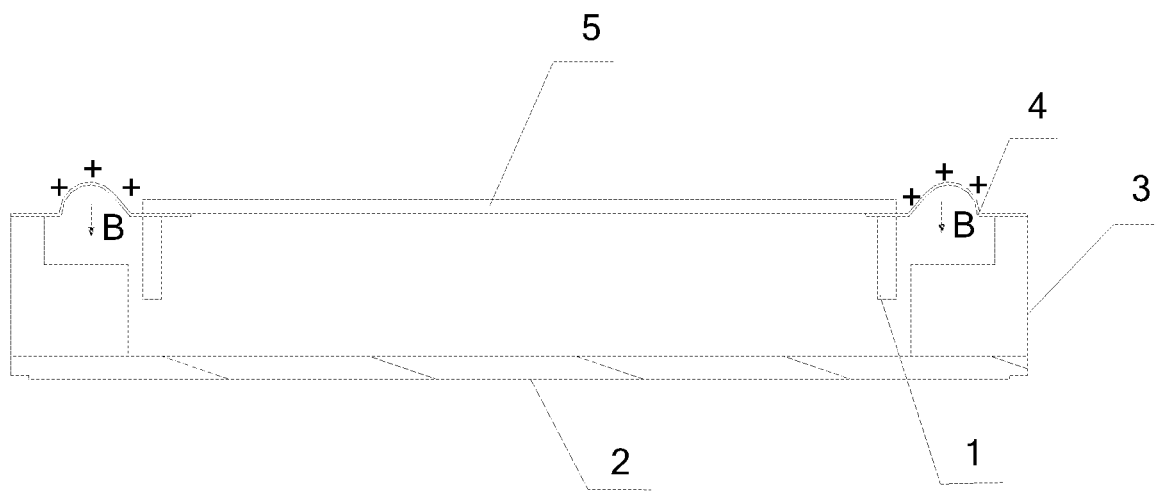
FIG. 5 is a second schematic diagram of distribution of cations in the vibration plate according to an embodiment of the present disclosure.

FIG. 5 is a schematic diagram of distribution of cations in the vibration plate 4 when a reverse current passes through the vibration plate 4. Cations move to a cathode side of the vibration plate 4 (that is, an upper side of the vibration plate 4 in FIG. 5), the vibration plate 4 moves downward and drives the dome 5 to move downward, and B shown in FIG. 5 is a movement direction of the vibration plate 4.

By applying a voltage to an ion-conductive vibration plate, cations in a polymer electrolyte of the ion-conductive vibration plate move to the cathode side, causing a difference in swelling between the front and the back of the ion-conductive vibration plate and then causing the ion-conductive vibration plate to deform. When an alternating current is applied to the ion-conductive vibration plate, the ion-conductive vibration plate will drive the dome 5 to vibrate reciprocally, thereby driving air around the dome 5 to vibrate to make sound.

For example, in a scenario where heat dissipation for an electronic device is required to be monitored, a temperature of the electronic device is monitored by a temperature sensor in the electronic device. After the temperature reaches a temperature point for heat dissipation, the electronic device outputs a low-power electrical signal of about 0.05 W to the vibration plate 4. The energized vibration plate 4 can vibrate reciprocally, thereby driving the surrounding to vibrate to make sound, to remind the user that the temperature of the electronic device is relatively high and heat dissipation is required for the electronic device to avoid damage to the device.

In a scenario where automatic heat dissipation is required, the temperature is monitored by the temperature sensor in the electronic device. After the temperature reaches a temperature point for heat dissipation, the electronic device outputs the low-power electrical signal of about 0.05 W to the vibration plate 4. The energized vibration plate 4 can vibrate reciprocally, thereby driving the surrounding to vibrate to make sound and driving the surrounding air to flow for heat dissipation.

Further, when the voltage applied to the ion-conductive vibration plate is a first voltage, the ion-conductive vibration plate drives the dome 5 to move a first distance along a first direction; or when the voltage applied to the ion-conductive vibration plate is a third voltage, the ion-conductive vibration plate drives the dome 5 to move a second distance along a first direction; where polarities of the first voltage and the third voltage are the same, the third voltage is greater than the first voltage, and the first distance is different from the second distance, for example, the second distance may be greater than the first distance. When it is required that the dome 5 move a relatively long distance, the dome 5 can be driven, by application of a relatively great voltage to the ion-conductive vibration plate, to move the relatively long distance; and when it is required that the dome 5 move a relatively short distance, the dome 5 can be driven, by application of a relatively small voltage to the ion-conductive vibration plate, to move the relatively short distance. There is a correspondence between the magnitude of the voltage applied to the ion-conductive vibration plate and a movement distance for the dome 5. In a case that the distance that the dome 5 is required to move is determined, the magnitude of the voltage applied to the ion-conductive vibration plate can be determined according to the correspondence. Definitely, in other embodiments of the present disclosure, the second distance may be less than the first distance.

Further, when the voltage applied to the ion-conductive vibration plate is the first voltage, the ion-conductive vibration plate drives the dome 5 at a first rate to move along the first direction; or when the voltage applied to the ion-conductive vibration plate is the third voltage, the ion-conductive vibration plate drives the dome 5 at a second rate to move along the first direction; where polarities of the first voltage and the third voltage are the same, the third voltage is greater than the first voltage, and the first rate is different from the second rate. For example, the second rate may be less than the first rate. When it is required that the dome 5 move at a relatively great rate, the dome 5 can be driven, by application of a relatively great voltage to the ion-conductive vibration plate, to move at the relatively great rate; and when it is required that the dome 5 move at a relatively small rate, the dome 5 can be driven, by application of a relatively small voltage to the ion-conductive vibration plate, to move at the relatively small rate. Definitely, in other implementation manners of the present disclosure, the second rate may be greater than the first rate. In the present disclosure, there is a correspondence between the magnitude of the voltage applied to the ion-conductive vibration plate and a movement rate for the dome 5. In a case that the rate at which the dome 5 is required to move is determined, the magnitude of the voltage applied to the ion-conductive vibration plate can be determined according to the correspondence.

The speaker may include two working modes: a sound making mode and a vibration mode. In the sound making mode, the voltage applied to the ion-conductive vibration plate may be a fourth voltage whose polarity is alternately changed, and the fourth voltage has a relatively great value, which can drive the dome 5 to move rapidly and achieve high-frequency vibration of the dome 5, thereby driving air around the dome 5 to vibrate to make sound. In the vibration mode, the voltage applied to the ion-conductive vibration plate may be a fifth voltage whose polarity is alternately changed. The fifth voltage has a relatively small value, which can drive the dome 5 to move and achieve low-frequency vibration of the dome 5, and the speaker is reused as a vibration motor.

As shown in FIG. 1, the lower shell 2 and the middle shell 3 are fixedly connected, specifically by welding, and the lower shell 2 and the middle shell 3 play a supporting role. As shown in FIG. 2, the electric vibration plate 4 is an annular structural member provided with a first through hole, and the dome 5 covers the first through hole. The electric vibration plate 4 and the dome 5 may be detachably connected, for example, the electric vibration plate 4 and the dome 5 may be bonded by an adhesive, so that the dome 5 can be easily replaced when a failure occurs on the dome 5.

Further, the counterweight body 1 is an annular structural member provided with a second through hole, and the first through hole and the second through hole are distributed opposite to each other. The counterweight body 1 is configured to adjust a resonant frequency of the speaker. The counterweight 1 has a certain weight, and the weight can be set according to the actual situation, which is not limited herein. The counterweight body 1 can be bonded with the electric vibration plate 4. The counterweight body 1 may be rectangular, oval, or the like, so that a force acting by the counterweight body 1 on the electric vibration plate 4 is even.

Further, the electric vibration plate 4 has a first region, a second region, and a third region.

The counterweight body 1 is disposed in the first region of the electric vibration plate 4, the electric vibration plate 4 is connected to the middle shell 3 through the second region, and the third region is located between the first region and the second region.

The third region of the electric vibration plate 4 is recessed in a direction toward the lower shell 2, or the third region of the electric vibration plate 4 is recessed in a direction away from the lower shell 2.

The first region, the second region, and the third region are located on a first surface of the electric vibration plate 4, and the counterweight body 1 is connected to the first region of the electric vibration plate 4, specifically by bonding. The middle shell 3 is connected to the second region of the electric vibration plate 4, and the third region of the electric vibration plate 4 is recessed in the direction toward the lower shell 2, or the third region of the electric vibration plate 4 is recessed in the direction away from the lower shell 2, so that the third region forms a curved radian, which helps the electric vibration plate 4 to drive, in a case of deformation, the dome 5 to move back and forth.

As shown in FIG. 2, the middle shell 3 is provided with a third through hole, and a gap is formed between the counterweight body 1 and the middle shell 3, so that the counterweight body 1 is suspended in the accommodating cavity, to prevent, when the electric vibration plate 4 is deformed and drives the dome 5 to move toward the lower shell 2, that the middle shell 3 hinders movement of the electric vibration plate 4. The counterweight body 1 can generate an acting force on the electric vibration plate 4 by its own gravity, and adjust a resonant frequency of the dome 5.

Further, the third through hole is a counterbore, and a countersunk head of the counterbore is located at an end of the middle shell 3 away from the dome 5. In a movement direction of the dome 5, projections of the dome 5 and the counterweight body 1 are both located within a projection of the counterbore, so that the counterweight body 1 and the dome 5 can move back and forth in the counterbore. A height of the counterweight body 1 is greater than half of the height of the counterbore, and a height of the counterweight body 1 is less than a height of the counterbore, so that the counterweight body 1 can be suspended in the counterbore and move with the movement of the dome 5.

As shown in FIG. 2, the speaker further includes a vibration plate bracket, the vibration plate bracket is disposed around the electric vibration plate 4, and the electric vibration plate 4 is fixedly connected to the middle shell 3 through the vibration plate bracket, the vibration plate bracket can be made of a low-cost insulating material, so as to save consumption of the electric vibration plate 4 and reduce the costs for the speaker.

In an embodiment of this application, an electronic device is further provided, and the electronic device includes the speaker in the foregoing embodiments. Since no magnetic steel or coil is provided in a structure of the foregoing speaker, no magnetic field interference will be generated to circuits and devices around the speaker, so that the working environment for the circuits and devices around the speaker can be purified. In addition, the speaker has a simple structure and occupies small space, which can better meet the requirements for thinning the electronic device.

The foregoing descriptions are implementations of the present disclosure, but are not intended to limit the scope of the present disclosure. Any variation or replacement readily figured out by a person skilled in the art within the technical scope disclosed in the present disclosure shall fall within the scope of the present disclosure. Therefore, the scope of the present disclosure shall be subject to the scope of the claims.

The invention claimed is:

1. A speaker, comprising:
a counterweight body;
a lower shell;
a middle shell;
an electric vibration plate; and
a dome, wherein
the lower shell, the middle shell, and the electric vibration plate are matched to form an accommodating cavity, and the counterweight body is disposed in the accommodating cavity and is connected to a first surface of the electric vibration plate;
the dome is disposed on a second surface of the electric vibration plate away from the counterweight body; and
when a voltage is applied to the electric vibration plate, the electric vibration plate drives the dome to move.

2. The speaker according to claim 1, wherein the electric vibration plate is an annular structural member provided with a first through hole, and the dome covers the first through hole.

3. The speaker according to claim 2, wherein the counterweight body is an annular structural member provided with a second through hole, and the first through hole and the second through hole are distributed opposite to each other.

4. The speaker according to claim 1, wherein the electric vibration plate is an ion-conductive vibration plate;
when a voltage applied to the ion-conductive vibration plate is a first voltage, the ion-conductive vibration plate drives the dome to move along a first direction; or
when a voltage applied to the ion-conductive vibration plate is a second voltage, the ion-conductive vibration plate drives the dome to move along a second direction, wherein
polarities of the first voltage and the second voltage are opposite, and the first direction is opposite to the second direction.

5. The speaker according to claim 4, wherein when the voltage applied to the ion-conductive vibration plate is the first voltage, the ion-conductive vibration plate drives the dome to move a first distance along the first direction; or
when the voltage applied to the ion-conductive vibration plate is a third voltage, the ion-conductive vibration plate drives the dome to move a second distance along the first direction, wherein polarities of the first voltage and the third voltage are the same, the third voltage is greater than the first voltage, and the first distance is different from the second distance.

6. The speaker according to claim 4, wherein when the voltage applied to the ion-conductive vibration plate is the first voltage, the ion-conductive vibration plate drives the dome at a first rate to move along the first direction; or
when the voltage applied to the ion-conductive vibration plate is a third voltage, the ion-conductive vibration plate drives the dome at a second rate to move along the first direction, wherein polarities of the first voltage and the third voltage are the same, the third voltage is greater than the first voltage, and the first rate is different from the second rate.

7. The speaker according to claim 1, wherein the electric vibration plate has a first region, a second region, and a third region;
the counterweight body is disposed in the first region of the electric vibration plate, the electric vibration plate is connected to the middle shell through the second region, and the third region is located between the first region and the second region; and
the third region of the electric vibration plate is recessed along a direction toward the lower shell, or the third region of the electric vibration plate is recessed along a direction away from the lower shell.

8. The speaker according to claim 1, wherein a third through hole is provided in the middle shell, and a gap is formed between the counterweight body and the middle shell.

9. The speaker according to claim 8, wherein the third through hole is a counterbore, and a countersunk head of the counterbore is located at an end of the middle shell away from the dome, and in a movement direction of the dome, projections of the dome and the counterweight body are both located within a projection of the counterbore.

10. The speaker according to claim 1, further comprising:
a vibration plate bracket, wherein the vibration plate bracket is disposed around the electric vibration plate, and the electric vibration plate is fixedly connected to the middle shell through the vibration plate bracket.

11. An electronic device, comprising a speaker, wherein the speaker comprises:
a counterweight body;
a lower shell;
a middle shell;
an electric vibration plate; and
a dome, wherein
the lower shell, the middle shell, and the electric vibration plate are matched to form an accommodating cavity, and the counterweight body is disposed in the accommodating cavity and is connected to a first surface of the electric vibration plate;
the dome is disposed on a second surface of the electric vibration plate away from the counterweight body; and
when a voltage is applied to the electric vibration plate, the electric vibration plate drives the dome to move.

12. The electronic device according to claim 11, wherein the electric vibration plate is an annular structural member provided with a first through hole, and the dome covers the first through hole.

13. The electronic device according to claim 12, wherein the counterweight body is an annular structural member provided with a second through hole, and the first through hole and the second through hole are distributed opposite to each other.

14. The electronic device according to claim 11, wherein the electric vibration plate is an ion-conductive vibration plate;
when a voltage applied to the ion-conductive vibration plate is a first voltage, the ion-conductive vibration plate drives the dome to move along a first direction; or
when a voltage applied to the ion-conductive vibration plate is a second voltage, the ion-conductive vibration plate drives the dome to move along a second direction, wherein
polarities of the first voltage and the second voltage are opposite, and the first direction is opposite to the second direction.

15. The electronic device according to claim 14, wherein when the voltage applied to the ion-conductive vibration plate is the first voltage, the ion-conductive vibration plate drives the dome to move a first distance along the first direction; or when the voltage applied to the ion-conductive vibration plate is a third voltage, the ion-conductive vibration plate drives the dome to move a second distance along the first direction, wherein polarities of the first voltage and the third voltage are the same, the third voltage is greater than the first voltage, and the first distance is different from the second distance.

16. The electronic device according to claim 14, wherein when the voltage applied to the ion-conductive vibration plate is the first voltage, the ion-conductive vibration plate drives the dome at a first rate to move along the first direction; or
when the voltage applied to the ion-conductive vibration plate is a third voltage, the ion-conductive vibration plate drives the dome at a second rate to move along the first direction, wherein polarities of the first voltage and the third voltage are the same, the third voltage is greater than the first voltage, and the first rate is different from the second rate.

17. The electronic device according to claim 11, wherein the electric vibration plate has a first region, a second region, and a third region;
the counterweight body is disposed in the first region of the electric vibration plate, the electric vibration plate is connected to the middle shell through the second region, and the third region is located between the first region and the second region; and
the third region of the electric vibration plate is recessed along a direction toward the lower shell, or the third region of the electric vibration plate is recessed along a direction away from the lower shell.

18. The electronic device according to claim 11, wherein a third through hole is provided in the middle shell, and a gap is formed between the counterweight body and the middle shell.

19. The electronic device according to claim 18, wherein the third through hole is a counterbore, and a countersunk head of the counterbore is located at an end of the middle shell away from the dome, and in a movement direction of the dome, projections of the dome and the counterweight body are both located within a projection of the counterbore.

20. The electronic device according to claim 11, wherein the speaker further comprises:
a vibration plate bracket, wherein the vibration plate bracket is disposed around the electric vibration plate, and the electric vibration plate is fixedly connected to the middle shell through the vibration plate bracket.

* * * * *